(12) United States Patent
Sepkhanov et al.

(10) Patent No.: US 9,398,663 B2
(45) Date of Patent: Jul. 19, 2016

(54) LUMINAIRE FOR ROAD ILLUMINATION WITH SENSOR

(71) Applicant: KONINKLIJKE PHILIPS N.V., Eindhoven (NL)

(72) Inventors: Ruslan Akhmedovich Sepkhanov, Eindhoven (NL); Fetze Pijlman, Eindhoven (NL); Siebe Tjerk De Zwart, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/889,112

(22) PCT Filed: Apr. 18, 2014

(86) PCT No.: PCT/EP2014/058002
§ 371 (c)(1),
(2) Date: Nov. 4, 2015

(87) PCT Pub. No.: WO2014/180647
PCT Pub. Date: Nov. 13, 2014

(65) Prior Publication Data
US 2016/0081157 A1   Mar. 17, 2016

(30) Foreign Application Priority Data

May 7, 2013 (EP) ..................................... 13166745

(51) Int. Cl.
*H05B 33/08* (2006.01)
*H05B 37/02* (2006.01)

(52) U.S. Cl.
CPC ........ *H05B 33/0854* (2013.01); *H05B 37/0218* (2013.01); *Y02B 20/46* (2013.01); *Y02B 20/72* (2013.01)

(58) Field of Classification Search
CPC .. H05B 33/0854; F21S 8/032; F21W 2111/02
USPC .................................................. 315/153, 291
See application file for complete search history.

(56) References Cited

U.S. PATENT DOCUMENTS

| | | | |
|---|---|---|---|
| 2005/0002203 A1 | 1/2005 | Kojima | |
| 2007/0010312 A1* | 1/2007 | Ike | A63F 5/00 463/17 |
| 2009/0273941 A1* | 11/2009 | Englander | B60Q 1/24 362/464 |
| 2012/0268602 A1 | 10/2012 | Hirai | |

(Continued)

FOREIGN PATENT DOCUMENTS

| | | |
|---|---|---|
| CN | 201697043 U | 1/2011 |
| JP | 6111948 A | 4/1994 |

(Continued)

*Primary Examiner* — Don Le

(57) ABSTRACT

The invention relates to a luminaire for road illumination, said luminaire (1) comprising a housing (3) containing a light source (5) provided with optics (6). The luminaire further comprising a sensor unit (7) adapted to measure optical properties of the surrounding of the luminaire and a calculation unit adapted to calculate the parameters for controlling the light output of the luminaire based on the optical properties measured by the sensor unit. According to the invention, the sensor unit is adapted to measure specular and diffuse reflection properties of the surrounding of the luminaire. These optical properties allow determining the type of weather or the road condition and adjustment of the light output of the luminaire, thus improving the road safety.

13 Claims, 2 Drawing Sheets

(56) References Cited

U.S. PATENT DOCUMENTS

| | | | | |
|---|---|---|---|---|
| 2014/0292208 A1* | 10/2014 | Chemel | ............ | H05B 33/0854 315/154 |
| 2014/0301070 A1* | 10/2014 | Oostdyk | ................... | F21K 9/50 362/231 |
| 2014/0313504 A1* | 10/2014 | Gutierrez Mendez | . | G01N 21/55 356/72 |
| 2014/0354150 A1* | 12/2014 | Joseph | ............... | H05B 33/0872 315/51 |

FOREIGN PATENT DOCUMENTS

| | | |
|---|---|---|
| WO | 2009047693 A2 | 4/2009 |
| WO | 2011037475 A1 | 3/2011 |
| WO | 2012143900 A1 | 10/2012 |
| WO | 2012159633 A1 | 11/2012 |

\* cited by examiner

LUMINAIRE FOR ROAD ILLUMINATION WITH SENSOR

CROSS-REFERENCE TO PRIOR APPLICATIONS

This application is the U.S. National Phase application under 35 U.S.C. §371 of International Application No. PCT/EP2014/058002, filed on Apr. 18, 2014, which claims the benefit of European Patent Application No. 13166745.3, filed on May 7, 2013. These applications are hereby incorporated by reference herein.

FIELD OF THE INVENTION

The invention relates to a luminaire for road illumination, said luminaire comprising a housing containing a light source provided with optics, the luminaire further comprising a sensor unit adapted to measure optical properties of the surrounding of the luminaire and a calculation unit adapted to calculate the parameters for controlling the light output of the luminaire based on the optical properties measured by the sensor unit. The invention also relates to a system of luminaires for road illumination, each luminaire comprising a housing containing a light source with related optics and a communication unit for mutual communicating data which is used for the light output of the luminaires as well as to a measuring element comprising a sensor unit suitable for use in a luminaire. A luminaire of the described type may be used as a separate outdoor road lighting component or used in combination with a pole. In latter situation, the sensor unit and/or the calculation unit may be positioned in the pole instead of in the luminaire housing.

BACKGROUND OF THE INVENTION

Figure 1:
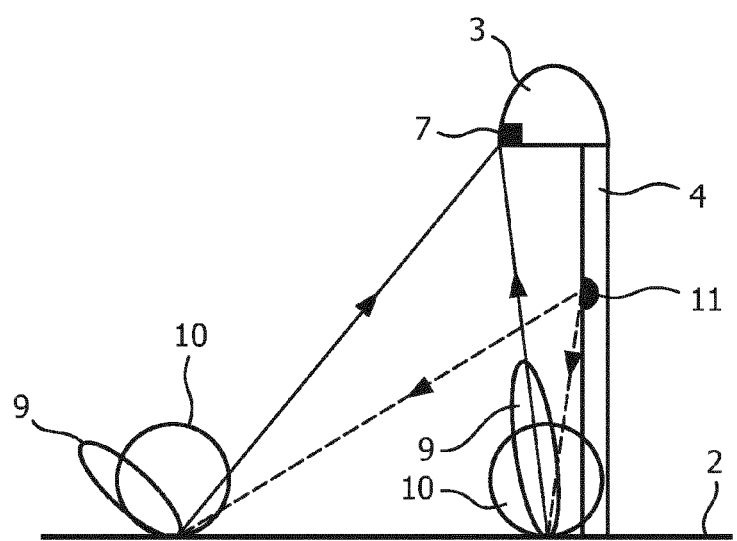

A luminaire as well as a system of luminaires of the types described in the opening paragraph are known as such. For example, the patent application with publication number WO2012/159633 shows in its FIG. 1 schematically an intelligent lamp for outdoor application comprising a sensor unit, a calculation unit, a communication unit and a lamp housing with a light source and related optics. Table 1 of this patent publication describes in detail a number of different weather types and/or road conditions measured by the sensor and the patterns of operation of the lamp based on these whether types.

The mentioned patent publication however has the clear problem in that it fails in disclosing a clear technical teaching how various weather types and/or road conditions can be distinguished by the sensor.

It is an object of the invention to overcome or at least reduce the technical problem present in the known (system of) luminaires. More particularly, the invention aims at providing a—preferably simple—way of measuring road- and/or weather-related information based on which the luminaire may adjust its light output in order to illuminate the road in an optimal manner.

SUMMARY OF THE INVENTION

These and possible other objects of the present invention are achieved with a luminaire for road illumination, said luminaire comprising a housing containing a light source provided with optics, the luminaire further comprising a sensor unit adapted to determine optical properties of a reflective reference surface or road surface in the surrounding of the luminaire by measuring light properties of light being reflected by said reflective reference surface or road surface and a calculation unit adapted to calculate the parameters for controlling the light output of the luminaire based on the optical properties measured by the sensor unit, wherein the optical properties at least comprise specular and diffuse reflection.

The invention is based on the insight acquired by the inventors that measuring the specular and diffuse reflective properties in the surrounding of the luminaire provides essential information regarding the weather type around the luminaire or the road condition in the vicinity of the luminaire. Said surrounding of which the reflective properties are measured relate to the road and can be the surface of the road itself or, for example, a reference surface close to the luminaire and/or the road. Said reference surface can be a standardized reference surface, but preferably has reflective properties that are representative for the road surface and further preferably has the same orientation or tilt as the road surface. Even further preferably said reference surface is exposed to the same atmospheric, ambient conditions as the road surface. The optical properties that can be measured and used for controlling the light output of the luminaire, can comprise light properties such as:

- the degree of specular and diffuse reflection;
- the ratio of diffuse and specular measured reflective light intensities;
- the ratio of reflective light intensity and light intensity as outputted by the light source;
- the pattern and polarization of the reflected light, for example a polarized, narrow beam with sharp contours of reflected light on a wet or icy surface versus a less polarized somewhat less narrow beam as reflected by a dry road surface versus a very diffuse, unpolarzied light beam with essentially no contours with (possibly) some shadow effects as reflected by a snowy surface;
- the color of reflected light which is significantly different for light after being reflected by a snowy road surface or a dry road surface.

These light measured properties are measured, are related to ambient circumstances and associated with essentially optimal illumination conditions. These associated data are stored in a database and used as a reference for comparison with actual measured optical properties and subsequently the associated optimal illumination conditions are set. To measure these properties typically a photo-sensor, a polarization sensor and/or an image sensor are used.

Said provided information thus can be used to adjust the light output of the light source/luminaire, so that the luminance of the road can be maintained rather constant under different weather and/or road conditions. Keeping the luminance constant appears to improve the safety of road users, who are not faced with strongly variable light intensities on the road. This applies especially to drivers of cars, trucks and other motorized vehicles, who are especially sensitive to variations in the road luminance.

In principle, one sensor is sufficient to determine both the mentioned specular and diffuse reflective properties. Such sensor should be able to measure these reflective properties under at least two angles, one of them substantially being the angle of the specular reflection; based on which measurements the specular and diffuse components may be derived. If two or more sensors are used, more accurate values may be obtained. Such two or more sensors may be positioned in the same luminaire or in different luminaires. An advantage of the luminaire of the invention is that for setting the road illumination conditions, the optical properties of the road surface itself are measured, contrary to the known system in which the illumination conditions are based on parameters that influence the optical properties of the road surface, i.e. indirect parameters like atmospheric conditions such as precipitation, ambient lighting conditions (time of the day), humidity etc.

The inventors further found that the amount of specular and diffuse reflection can be easily measured by the sensor unit and that the ratio between both reflection types can be calculated by the calculation unit. Different ratio can be assigned to different weather types and/or road conditions. Thus, by means of these measurements, it can be determined whether the road has a dry, a wet or a snowy surface. For optimization, calibration measurements may precede the actual measurements. Based on these measurements and calculations, parameters for controlling the light output can be determined, and applied to adapt the light output of the luminaire. It is stressed that the light output of the luminaire/light source can be adapted by changing the direction, width or profile (=light intensity distribution) of the light beam emitted by the light source as well as the intensity of the light output. Under special conditions, the spectrum (for example color or color temperature) and/or the polarization of the light emitted by the luminaire/light source may be changed as well. The measured light could comprise light originating from the luminaire itself and light surrounding the luminaire.

An interesting embodiment of the luminaire according to the present invention has the feature that the light output of the luminaire is continuously adapted based on the measurements of the calculation unit. This means that changes in the light output of the luminaire are gradually performed. Such continuous change of the light output may follow a continuous change in road condition, e.g. during drying of a wet road. Therefore the optimal light output is constantly provided. This measure further ensures that no abrupt changes in the light output will occur. Such abrupt light output changes are undesired from the point of road safety for especially drivers of motorized vehicles.

Another interesting embodiment of the invented luminaire shows the special characteristic that the sensor unit works with an emitter element. The presence of an emitter element which works together with the sensor element in the sensor unit may improve the accuracy of the measured specular and diffuse reflection components of the total reflection. This may lead to optimization in the adjustment of the light output of a luminaire or even of a luminaire system which includes a luminaire according of the present embodiment. With the help of an emitter element, the total reflection of the surface of the road as well as its two components (specular and diffuse reflection) can be measured with more accuracy due to an improved signal-to-noise-ratio. Such emitter element is preferably a laser-emitter. The emitter may be incorporated in the sensor unit or in another element of the luminaire.

A further embodiment of the invented luminaire is characterized in that the light source and the optics are mutually displaceable. Based upon the parameters calculated by the calculation unit, a mechanical adaptation of the light source or the optics related to the light source may take place. Thus, either the optics is displaced relative to the light source and the luminaire housing or the light source is displaced relative to the optics and the luminaire housing. In these two examples, the luminaire housing and one of the light source and the optics remains unchanged in their mutual position. The beam width or beam profile of the light generated by the light source and focused by the optics is changed by such type of displacement.

An even further embodiment of the luminaire according to the invention is characterized in that the optics comprises several optical elements, which can be positioned individually in front of the light source by means of a rotational movement. In the embodiment pursuant to this design two or more different optics can be rotated in front of the emitting area of the light source, which may be attached in a fixed position of the luminaire. The presence of different optics may cause different beam widths or the beam profiles emitting from the luminaire. Said different beam widths may correspond with different weather conditions and/or road conditions measured by the sensor unit, such as snowy, icy, dry or wet road conditions. Said rotation of the optics may be effected by a motor driving a gear wheel, said motor being directed by the results of the calculation unit.

Also interesting is the embodiment of the luminaire having the feature that the housing contains at least two light sources with related optics, which light sources can be powered individually during the operation of the luminaire. A luminaire according to this design has the advantage that the intensity of the light output as well as the beam shape emitted from the luminaire can be changed independently and continuously.

Much interest is also devoted to the embodiment of the invented luminaire which has the feature that wherein each of the light sources comprise at least one LED. The use of LEDs in outdoor luminaires provides different advantages. First, the maintenance costs of the luminaires are rather low due to relatively low energy consumption of the LEDs and their extreme long lifetime. Moreover, the light intensity of LEDs can be adapted rather simply as compared with other types of light sources, like sodium-vapor lamps or fluorescent lamps. The intensity of the light output of LEDs can be adapted by changing the overall current flow through the LEDs or using simple pulse width modulation scheme's which are widely available to persons skilled in this technical area.

Another embodiment of the invented luminaire shows the characteristic that the luminaire further comprises a control unit with a memory for storing default values of specular and diffuse reflection properties and a comparison element for comparing the stored and measured properties. Default reflection ratios of the specular and diffuse reflection can be stored in the memory of such control unit, which reflection ratios represent specific weather and/or road conditions. Said default values may represent calibration values which are measured after installation of the luminaires under different weather types and/or road conditions. During operation of a thus-designed luminaire, the sensor unit can measure the optical properties of the light surrounding the luminaire, which properties are used for calculating the reflection ratio of said light. This ratio is compared with the default ratios stored in the control unit memory. The best fitting ratio is selected and the related parameters are used for controlling the light output of the luminaire.

A further embodiment of the luminaire according to the invention has the feature that the luminaire further comprises a second sensor adapted for measuring atmospheric precipitation. With such additional sensor, the amount of the rain, fog or hail density can be measured during periods in which such atmospheric precipitation occurs. The measured values can be used together with the measured values of the reflected light obtained with the sensor unit to determine a better picture of the luminance of the road. So, this combined info may improve the possibilities to maintain said luminance of the road constant.

A very interesting embodiment of the invented luminaire has the feature that the luminaire further comprises a communication unit for communication data with other luminaires. Thus, data measured by means of the sensor unit present in this luminaire may be shared with other luminaires which are positioned at a relatively short distance from the luminaire of this design. The light output of the other luminaires may therefore be controlled by means of the data measured by the luminaire having the communication unit. The other luminaire may therefore lack a sensor unit and a calculation unit. When all luminaires have sensors, the communication between the luminaries decreases the possibility of errors and thus makes the system more robust.

The invention also pertains to a system of luminaires for road illumination, each luminaire comprising a housing containing a light source with related optics and a communication unit for mutual communicating data which is used for the light output of the luminaries, whereby the system comprises at least one luminaire with a sensor unit and a calculation unit as described before.

The invention also relates to a measuring element comprising a sensor unit suitable for use in a luminaire as described before. The sensor unit of this measuring element is adapted to measure specular and diffuse reflective properties of the surrounding of the measuring element, and a calculation unit adapted to calculate the parameters for controlling the light output of the luminaire based on the optical properties measured by the sensor unit. The measuring element preferably comprises a control unit with a memory for storing default values of specular and diffuse reflection properties and a comparison element for comparing the stored and measured properties. Such measuring unit may be installed in the housing or the post of a luminaire or at certain distance away from the luminaire.

BRIEF DESCRIPTION OF THE INVENTION

These and other aspects of the invention will be apparent from and elucidated with reference to the embodiments described hereinafter.

Figure 2:
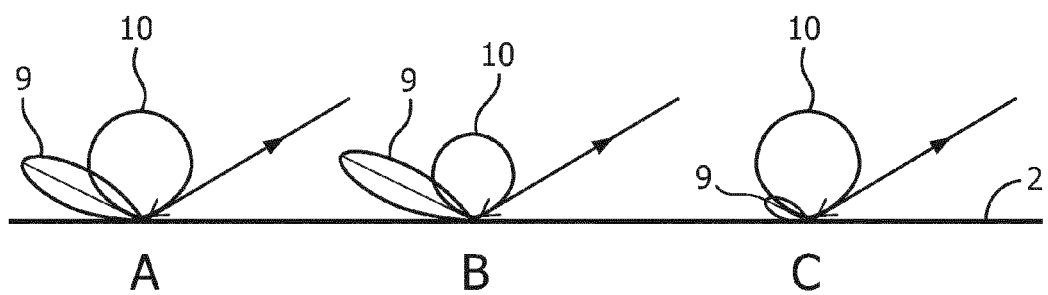
Figure 3:
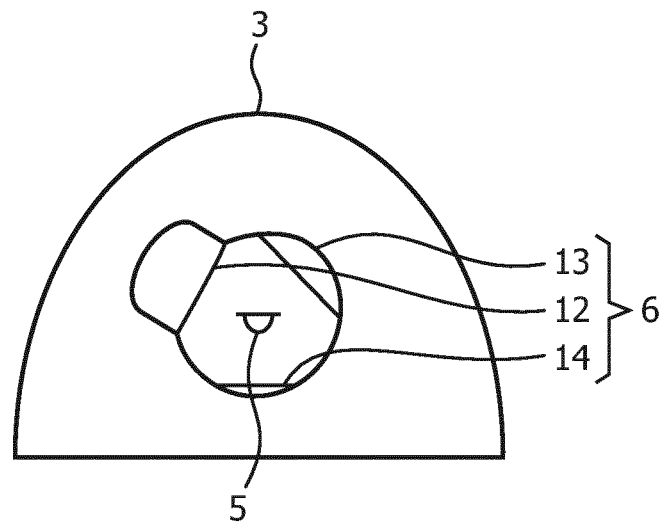
Figure 4:
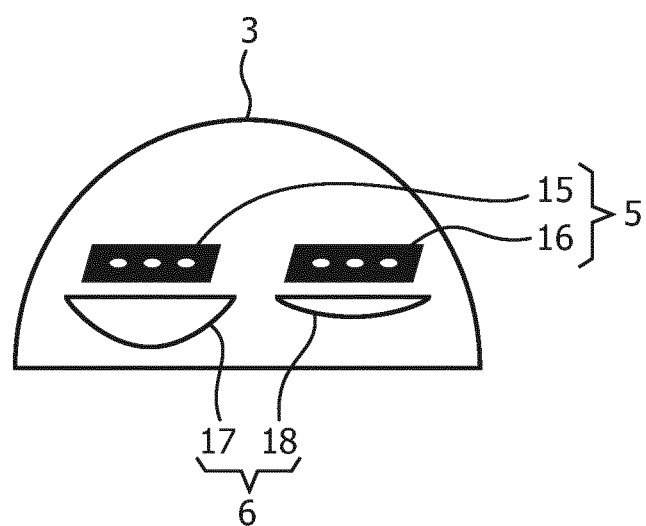

In the drawings:

FIG. 1 shows a schematic view of a luminaire according to the present invention, FIG. 2 specular and diffuse reflections as measured by a luminaire according to the present invention, FIG. 3 shows a cross-section of the housing part of a luminaire according to the present invention, and FIG. 4 shows a cross-section of the housing part of another luminaire according to the present invention.

It is stressed that the drawings are schematic and not to scale. In the different Figures, the same elements are denoted with the same reference numbers.

DETAILED DESCRIPTION OF EMBODIMENTS

FIG. 1 schematically shows a luminaire 1 according to the present invention, for illumination of a road 2. Luminaire 1 comprises a housing 3 which is connected to a pole 4. Housing 3 contains a light source 5 (not shown) formed as a plurality of LEDs, which are provided with optics 6 (not shown). Details of light source 5 and optics 6 are depicted in FIGS. 3 and 4.

Luminaire 1 further comprises a sensor unit 7, which is adapted to measure optical properties of the surrounding of the luminaire and a calculation unit 8 (not shown) adapted to calculate parameters for controlling the light output of the luminaire based on the optical properties measured by the sensor unit 7. Under the present weather and/or road conditions, reflections from road 2 are measured. Sensor unit 7 is adapted to measure specular reflection 9 and diffuse reflection 10 of the surrounding of the luminaire 1 under at least two different angles, one of them substantially being the angle of the specular reflection.

In the present situation, sensor unit is positioned in housing 3, but could alternatively be positioned in pole 4.

Luminaire 1 is also provided with an emitter element 11 embodied as a laser emitter, which is positioned in pole 4 of the luminaire. During operation of the luminaire, laser light emitted by laser emitter element 11 is reflected by road 2. Part of the emitted laser light is reflected by the road in the direction of sensor unit 7. From the measurements performed with sensor unit 7, both the contributions of the specular reflection 9 and the diffuse reflection 10 are derived, and the ratio of both contributions is determined by calculation unit 8 (not shown). This ratio is used for adapting the light output of luminaire 1.

FIG. 2 show schematically the reflection of a certain road based on three road conditions related to different types of weather. Both the contributions of the diffuse reflection 10 and the specular reflection 9 are schematically indicated. This Figure illustrates that the specular/diffuse-ratio increases when measured to respectively a dry road (FIG. 2-A) and a wet road (FIG. 2-B) and a snowy road (FIG. 2-C). These differences in ratio of the specular reflection 9 and the diffuse reflection 10 allow identifying the condition of the road. The contributions of both reflection types for a standard condition like dry, wet, rainy, foggy and snowy may differ per road. Therefore, calibration of the standard conditions is preferred. Thus, said contributions of both reflections are measured after a luminaire or a system of luminaires has been installed. The measured values are subsequently stored as default values in a memory of a control unit. Measured values afterwards are compared with these stored default values in order to determine the weather type and/or the road condition and to adapt subsequently the light output of the (system of) luminaire(s).

The described luminaire according to the present invention allows for a continuous adaptation of its light output. This offers clear advantages during changes in road conditions. When road 2 is dry the sensor unit 7 may measure a certain intensity value A of the diffuse reflection 10. The beam profile Idry emitted by the light source 5 and optics 6 is optimal for dry road 2. When road 2 becomes wet, the intensity of diffuse reflection 10 decreases and the intensity of the specular reflection 9 increases. When road 2 is completely wet the intensity of the diffuse reflection 9 is B. The beam profile generated by the combined light source 5 and optics 6 Iwet is made optimal for wet road 2. The values A and B can either be calibrated at the moment of installation of the (system of) luminaire(s) 1 or some typical default values can be used instead of those obtained in the calibration. As road 2 dries or becomes wet, the sensor unit 7 continuously follows the change in the intensity of the diffuse reflection 10, measuring a value R between B and A. The luminaire provides dry and wet beams in the same proportions, that is the total beam profile is $I=Idry*(R-B)/(A-B)+Iwet*(A-R)/(A-B)$.

FIGS. 3 and 4 depict two ways of adaptation of the light output of luminaire 1 according to the present invention. FIG. 3 shows schematically and in cross-section housing 3 of luminaire 1. Said housing 3 comprises a single light source 5, which contains a plurality of high power LEDs (not shown in detail). Optics 6 comprises three differently shaped lenses 12, 13 and 14. Optics 6 is positioned in housing 3 such that it can be rotated around light source 5, so that the three lenses 12, 13 and 14 can be positioned in front of light source 5.

The light output of luminaire 1 according to this embodiment of the invention can be changed in two manners. Firstly, the intensity of the LEDs can be adjusted. Such adjustment is possible in a continuous way by changing the electrical current flow through the LEDs or powering the LEDs with specific pulse width modulation techniques. Secondly, the width or shape of the beam emitted by the luminaire can be adjusted by changing the lens 12, 13 or 14 which is positioned in front of the LEDs for another of these three lenses. Such adjustment is only possible in a non-continuous way. Such adaptation of the light output may be necessary because of a change in the type of weather or the road condition measured by sensor unit 3, based on a change in the ratio between the specular and diffuse reflection.

FIG. 4 shows schematically and in cross-section an alternative structure, comprising a housing 3 of luminaire 1. Housing 3 comprises two light sources 5, which both comprise a plurality of high power LEDs 15 and 16 (only three are shown). In front of each light source 15 and 16, an optics 6 in the form of lenses 17 respectively 18 is positioned. These lenses are differently shaped and therefore result in different beam shapes. During operation of the luminaire, both light sources 15 and 16 may be powered, whereby the light output of the luminaire may be formed of a mixture or superposition of the individual beams generated by both light sources 15 and 16. The present embodiment has the advantage that no mechanically movable parts are present in the housing.

The light output of luminaire 1 according to this embodiment of the invention can be changed in two manners. First, the intensity of the LEDs in both light sources 15 and 16 can be adjusted. Such adjustment is possible in a continuous way by changing the electrical current flow through the LEDs or powering the LEDs with specific pulse width modulation techniques. Secondly, the width or shape of the beam emitted by the luminaire can be adjusted by changing the light intensities of individual light sources 15 or 16, whereby the total light output of luminaire 1 may remain constant. This can be achieved by increasing the light intensity of the one light source 15 while decreasing the light intensity of the other light source 16. As a result, the beam width or beam shape of luminaire 1 change. Such adjustment is possible in a continuous way. Such adaptation of the light output may be necessary because of a change in the type of weather or the road condition measured by sensor unit 3, based on a change in the ratio between the specular and diffuse reflection.

While the invention has been illustrated and described in detail in the drawing and foregoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word 'comprising' does not exclude other elements or steps, and the indefinite article 'a' or 'an' does not exclude a plurality. The mere fact that certain measures are recited in mutually different claims does not indicate that a combination of these measures cannot be used to advantage. Any reference signs in the claims should not be construed as limiting the scope of these claims.

The invention claimed is:

1. Luminaire for road illumination, said luminaire comprising a housing containing a light source provided with optics, the luminaire further comprising a sensor unit adapted to determine optical properties of a reflective reference surface or road surface in the surrounding of the luminaire by measuring light properties of light being reflected by said reflective reference surface or road surface and a calculation unit adapted to calculate the parameters for controlling the light output of the luminaire based on the optical properties measured by the sensor unit, wherein the optical properties at least comprise specular and diffuse reflection.

2. Luminaire according to claim 1, wherein the light output of the luminaire is continuously adapted based on the measurements of the calculation unit.

3. Luminaire according to claim 1, wherein the sensor unit works with an emitter element.

4. Luminaire according to claim 1, wherein the light source and the optics are mutually displaceable.

5. Luminaire according to claim 4, wherein the optics comprises several optical elements, which can be positioned individually in front of the light source by means of a rotational movement.

6. Luminaire according to claim 5, wherein the housing contains at least two light sources with related optics, which light sources can be powered individually during the operation of the luminaire.

7. Luminaire according to claim 6, wherein each of the light sources comprise at least one LED.

8. Luminaire according to claim 1, wherein the luminaire further comprises a control unit with a memory for storing default values of specular and diffuse reflection properties and a comparison element for comparing the stored and measured properties.

9. Luminaire according to claim 8, wherein the luminaire further comprises a second sensor adapted for measuring atmospheric precipitation.

10. Luminaire according to claim 9, wherein the luminaire further comprises a communication unit for communication data with other luminaires.

11. System of luminaires for road illumination, each luminaire comprising a housing containing a light source with related optics and a communication unit for mutual communicating data which is used for the light output of the luminaries, whereby the system comprises at least one luminaire according to claim 1.

12. Measuring element comprising a sensor unit suitable for use in an luminaire according to claim 8, wherein the sensor unit is adapted to measure specular and diffuse reflective properties of the surrounding of the measuring element, and a calculation unit adapted to calculate the parameters for controlling the light output of the luminaire based on the optical properties measured by the sensor unit.

13. Measuring element according to claim 12, wherein the element further comprises a control unit with a memory for storing default values of specular and diffuse reflection properties and a comparison element for comparing the stored and measured properties.

* * * * *